United States Patent
Guo et al.

(10) Patent No.: US 11,709,258 B2
(45) Date of Patent: Jul. 25, 2023

(54) LOCATION DATA CORRECTION SERVICE FOR CONNECTED VEHICLES

(71) Applicant: Toyota Motor Engineering & Manufacturing North America, Inc., Plano, TX (US)

(72) Inventors: Rui Guo, Mountain View, CA (US); Mahmoud Ashour, Mountain View, CA (US); Ahmed Sakr, Mountain View, CA (US); Bin Cheng, Mountain View, CA (US); Hongsheng Lu, Mountain View, CA (US); Prashant Tiwari, Mountain View, CA (US)

(*) Notice: Subject to any disclaimer, the term of this patent is extended or adjusted under 35 U.S.C. 154(b) by 174 days.

(21) Appl. No.: 16/937,523

(22) Filed: Jul. 23, 2020

(65) Prior Publication Data
US 2022/0026566 A1  Jan. 27, 2022

(51) Int. Cl.
| | |
|---|---|
| *G01S 13/931* | (2020.01) |
| *B60W 50/00* | (2006.01) |
| *G01S 19/01* | (2010.01) |
| *G05D 1/02* | (2020.01) |
| *H04W 4/02* | (2018.01) |
| *H04W 4/46* | (2018.01) |
| *H04W 84/18* | (2009.01) |

(52) U.S. Cl.
CPC .......... *G01S 13/931* (2013.01); *B60W 50/00* (2013.01); *G01S 19/01* (2013.01); *G05D 1/0276* (2013.01);
(Continued)

(58) Field of Classification Search
CPC ........ G01S 13/931; G01S 19/01; H04W 4/46; H04W 4/025; H04W 84/18; B60W 50/00;
(Continued)

(56) References Cited

U.S. PATENT DOCUMENTS

| | | | |
|---|---|---|---|
| 6,862,500 B2 * | 3/2005 | Tzamaloukas ...... | H04W 84/005 701/1 |
| 9,026,364 B2 * | 5/2015 | Parundekar ........ | G01C 21/3679 455/414.3 |

(Continued)

FOREIGN PATENT DOCUMENTS

CN    105682222    6/2016

OTHER PUBLICATIONS

Demetrious, et al., "CoDrive: Improving Automobile Positioning via Collaborative Driving," IEEE Infocom 2018—IEEE Conference on Computer Communications, Apr. 16, 2018, 80 pages.
(Continued)

*Primary Examiner* — Aniss Chad
*Assistant Examiner* — Christopher George Fees
(74) *Attorney, Agent, or Firm* — Burbage Law, P.C.; Jon-Michael Burbage

(57) ABSTRACT

The disclosure includes embodiments for a location data correction service for connected vehicles. A method includes receiving, by an operation center via a serverless ad-hoc vehicular network, a first wireless message that includes legacy location data that describes a geographic location of a legacy vehicle. The method includes causing a rich sensor set included in the operation center to record sensor data describing the geographic locations of objects in a roadway environment. The method includes determining correction data that describes a variance between the geographic location of the legacy vehicle as described by the sensor data and the legacy location data. The method includes transmitting a second wireless message to the legacy vehicle, wherein the second wireless message includes the correction data so that the legacy vehicle receives a benefit by correcting the legacy location data to minimize the variance.

20 Claims, 3 Drawing Sheets

(52) U.S. Cl.
CPC .......... *G05D 1/0287* (2013.01); *H04W 4/025* (2013.01); *H04W 4/46* (2018.02); *B60W 2050/0083* (2013.01); *G05D 2201/0213* (2013.01); *H04W 84/18* (2013.01)

(58) Field of Classification Search
CPC ........ B60W 2050/0083; G05D 1/0276; G05D 1/0287; G05D 2201/0213
See application file for complete search history.

(56) References Cited

U.S. PATENT DOCUMENTS

| | | |
|---|---|---|
| 10,231,187 B1 | 3/2019 | Rubin et al. |
| 2018/0146323 A1* | 5/2018 | Tseng .................. H04W 4/80 |
| 2018/0188045 A1* | 7/2018 | Wheeler ............... G06V 10/98 |
| 2018/0192233 A1 | 7/2018 | Del Regno et al. |
| 2019/0014446 A1* | 1/2019 | Gade .................... G08G 1/0141 |
| 2019/0035271 A1* | 1/2019 | Jain ....................... G08G 1/123 |
| 2019/0132706 A1* | 5/2019 | Altintas ................ H04W 4/40 |
| 2019/0132819 A1* | 5/2019 | Tseng .................... H04W 4/80 |
| 2019/0191265 A1* | 6/2019 | Altintas ................ H04L 67/10 |

OTHER PUBLICATIONS

Smaili, et al., "Multi-Sensor Fusion for Mono and Multi-Vehicle Localization using Bayesian Network," Intech Option Access Publisher, 2008, 18 pages.

Al Malki, et al., "An Enhanced Technique of Self-Correcting Localization Algorithm for Vehicular Node Position Accuracy in the Distributed VANET," ICNCC 2018, pp. 194-199.

* cited by examiner

LOCATION DATA CORRECTION SERVICE FOR CONNECTED VEHICLES

BACKGROUND

The specification relates to a location data correction service for connected vehicles. The correction service is serverless and provided by one or more connected vehicles.

Connected vehicles form clusters of interconnected vehicles (e.g., via vehicle-to-everything, i.e., "V2X") that are located at a similar geographic location. Distributed data storage and computing by a cluster of connected vehicles is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles.

Modern vehicles include Advanced Driver Assistance Systems (herein "ADAS systems") or automated driving systems. An automated driving system is a collection of ADAS systems which provides sufficient driver assistance that a vehicle is autonomous. ADAS systems and automated driving systems are referred to as "vehicle control systems."

A particular vehicle that includes these vehicle control systems is referred to herein as an "ego vehicle" and other vehicles in the vicinity of the ego vehicle are referred to as "remote vehicles."

Some ADAS systems need to know a precise geographic location of a particular vehicle in order to provide its functionality to this particular vehicle. There are other reasons that accurate location information is beneficial for the operation of a vehicle.

GPS systems are the most dominant location inference service provider. However, in the urban canyon area or the jamming traffic environment, the GPS receivers included in vehicular sensor sets are often suffering from a "multipath" error, which occurs when the receiver fails to discriminate between signals received from satellites and other signals that have been reflected from surrounding objects, such as buildings, trees, and even the ground. The arrangement of satellites in the sky also affects the accuracy of GPS positioning described by location data. GPS coordinates calculated when satellites are clustered close together in the sky suffer from dilution of precision (DOP) too, and therefore result in providing inaccurate location date.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for providing a location data correction service, the method executed by an operation center that includes a set of sensor rich vehicles and including: receiving, by the operation center via a serverless ad-hoc vehicular network, a first wireless message that includes legacy location data that describes a geographic location of a legacy vehicle, where the set of sensor rich vehicles and the legacy vehicle are connected vehicles; causing a rich sensor set included in the operation center to record sensor data describing geographic locations of objects in a roadway environment that includes the set of sensor rich vehicles and the legacy vehicles, where the objects whose geographic locations are described include the set of sensor rich vehicles and the legacy vehicle and where the sensor data is more accurate than the legacy location data for describing the geographic location of the legacy vehicle; determining correction data that describes a variance between the geographic location of the legacy vehicle as described by the sensor data and the legacy location data; and transmitting, as fulfillment of the location data correction service by the operation center, a second wireless message to the legacy vehicle, where the second wireless message includes the correction data so that the legacy vehicle receives a benefit by correcting the legacy location data to minimize the variance. Other embodiments of this aspect include corresponding computer systems, apparatus, and computer programs recorded on one or more computer storage devices, each configured to perform the actions of the methods.

Implementations may include one or more of the following features. The method where the set of sensor rich vehicles includes one ego vehicle. The method where the set of sensor rich vehicles includes a plurality of vehicles. The method where the plurality of vehicles executes the method via collaborative computing so that different vehicles are responsible for executing different portions of the method. The method where the operation center controls when vehicles join and leave the serverless ad-hoc vehicular network. The method where the operation center manages how the set of sensor rich vehicles contribute computing power to the serverless ad-hoc vehicular network for a purpose of executing the method and fulfilling the location data correction service. The method where the operation center controls which vehicles are eligible to join the serverless ad-hoc vehicular network based on their unused computing resources which they can make available to other members of the serverless ad-hoc vehicular network. The method where the operation center is a single member of the serverless ad-hoc vehicular network that includes a most computing power relative to the other members of the serverless ad-hoc vehicular network. The method where a determination of which vehicle included in the set of sensor rich vehicles is the operation center is made as members of the serverless ad-hoc vehicular network are driving in the roadway environment. The method where the location data correction service is provided by the operation center which does not include an infrastructure device, a base station, a roadside device, an edge server, an edge node, or a cloud server. The method where the operation center only includes members of the serverless ad-hoc vehicular network that are connected vehicles. Implementations of the described techniques may include hardware, a method or process, or computer software on a computer-accessible medium.

One general aspect includes a computer program product included in at least one onboard vehicle computer of an operation center that includes a set of sensor rich vehicles, the computer program product including computer code that is operable, when executed by the onboard vehicle computer, to cause the onboard vehicle computer to provide a location data correction service by executing steps including: receiving, by the operation center via a serverless ad-hoc vehicular network, a first wireless message that includes legacy location data that describes a geographic location of a legacy vehicle, where the set of sensor rich vehicles and the legacy vehicle are connected vehicles; causing a rich sensor set included in the operation center to record sensor data describing geographic locations of objects in a roadway environment that includes the set of sensor rich vehicles and the legacy vehicles, where the objects whose geographic locations are described include the set of sensor rich vehicles and the legacy vehicle and where the sensor data is more accurate than the legacy location data for describing the geographic location of the legacy vehicle; determining correction data that describes a variance between the geographic location of the legacy vehicle as described by the sensor data and the legacy location data; and transmitting, as fulfillment of the location data correction service by the operation center, a second wireless message to the legacy vehicle, where the second wireless message includes the correction data so that the legacy vehicle receives a benefit by correcting the legacy location data to minimize the variance. Other embodiments of this aspect include corresponding computer systems, apparatus, and computer programs recorded on one or more computer storage devices, each configured to perform the actions of the methods.

Implementations may include one or more of the following features. The computer program product where the set of sensor rich vehicles includes one ego vehicle. The computer program product where the set of sensor rich vehicles includes a plurality of vehicles. The computer program product where the plurality of vehicles executes the steps via collaborative computing so that different vehicles are responsible for executing different portions of the method. The computer program product where the operation center controls when vehicles join and leave the serverless ad-hoc vehicular network. The computer program product where the operation center manages how the set of sensor rich vehicles contribute computing power to the serverless ad-hoc vehicular network for a purpose of executing the steps and fulfilling the location data correction service. The computer program product where the operation center controls which vehicles are eligible to join the serverless ad-hoc vehicular network based on their unused computing resources which they can make available to other members of the serverless ad-hoc vehicular network. The computer program product where the operation center is a single member of the serverless ad-hoc vehicular network that includes a most computing power relative to the other members of the serverless ad-hoc vehicular network. Implementations of the described techniques may include hardware, a method or process, or computer software on a computer-accessible medium.

One general aspect includes a system included in an operation center that includes a set of sensor rich vehicles, the system operable to provide a location data correction service and including: a processor; a non-transitory memory communicatively coupled to the processor, where the non-transitory memory stores executable code that is operable, when executed by the processor, to cause the processor to: receive, by the operation center via a serverless ad-hoc vehicular network, a first wireless message that includes legacy location data that describes a geographic location of a legacy vehicle, where the set of sensor rich vehicles and the legacy vehicle are connected vehicles; cause a rich sensor set included in the operation center to record sensor data describing geographic locations of objects in a roadway environment that includes the set of sensor rich vehicles and the legacy vehicles, where the objects whose geographic locations are described include the set of sensor rich vehicles and the legacy vehicle and where the sensor data is more accurate than the legacy location data for describing the geographic location of the legacy vehicle; determine correction data that describes a variance between the geographic location of the legacy vehicle as described by the sensor data and the legacy location data; and transmit, as fulfillment of the location data correction service by the operation center, a second wireless message to the legacy vehicle, where the second wireless message includes the correction data so that the legacy vehicle receives a benefit by correcting the legacy location data to minimize the variance. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Modern vehicles include Advanced Driver Assistance Systems (ADAS) systems or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIG. 2.

Figure 1:
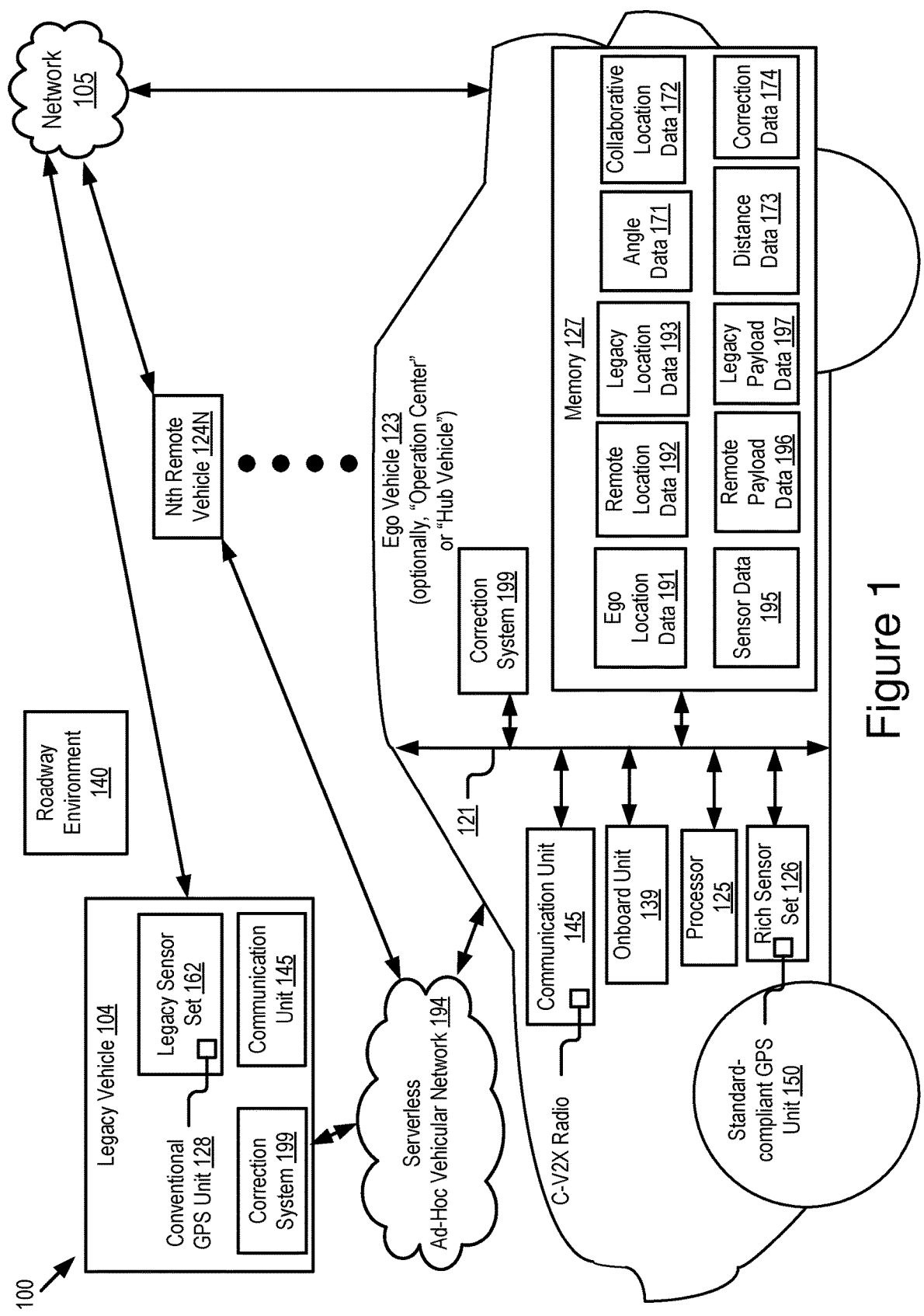
FIG. 1 is a block diagram illustrating an operating environment for a correction system according to some embodiments.

A particular vehicle that includes these vehicle control systems is referred to herein as an "ego vehicle" and other vehicles in the vicinity of the ego vehicle as "remote vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. An ego vehicle uses this image data to understand their environment and operate their vehicle control systems (e.g., ADAS systems or automated driving systems).

Vehicle Cloudification

A serverless ad-hoc vehicular network includes a group of connected vehicles that communicate with one another via V2X messages to provide a location data correction service.

The serverless ad-hoc vehicular network includes multiple members. A member of the serverless ad-hoc vehicular network includes a connected vehicle that sends and receives V2X messages via the serverless ad-hock vehicular network. In some embodiments, the members of the serverless ad-hock vehicular network are nodes of the serverless ad-hock vehicular network.

In some embodiments, a serverless ad-hock vehicular network is "serverless" because the serverless ad-hock vehicular network does not include a server. In some embodiments, a serverless ad-hock vehicular network is "ad-hock" because the serverless ad-hock vehicular network is formed its members when it is determined by one or more of the members to be needed or necessary. In some embodiments, a serverless ad-hock vehicular network is "vehicular" because the serverless ad-hock vehicular network only includes connected vehicles as its endpoints. In some embodiments, the term "network" refers to a V2V network.

In some embodiments, the serverless ad-hoc vehicular network only includes vehicles. For example, the serverless ad-hoc network does not include the following: an infrastructure device, a base station, a roadside device, an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network.

In some embodiments, the serverless ad-hock vehicular network includes a set of sensor rich vehicles. A sensor rich vehicle is a connected vehicle that includes a rich sensor set. An operating environment that includes the serverless ad-hock vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hock vehicular network. In some embodiments, the legacy vehicle is not an element of the serverless ad-hock vehicular network but receives a benefit of a location data correction service for location data that is provided by the members of the serverless ad-hock vehicular network. For example, the legacy vehicle is provided with correction data that enables the legacy vehicle to modify its own sensor data to adjust for variances in the sensor measurements recorded by the legacy sensor set relative to the sensor measurements recorded by the rich sensor sets of the sensor rich vehicles that are included in the serverless ad-hock vehicular network. In this way, the serverless ad-hock vehicular network is operable to improve the operation of the legacy vehicle, which in turn increases the safety of the sensor rich vehicles that are traveling in a vicinity of the legacy vehicle.

In some embodiments, the serverless ad-hock vehicular network is a vehicular micro cloud. It is not a requirement of the embodiments described herein that the serverless ad-hock vehicular network is a vehicular micro cloud. Accordingly, in some embodiments the serverless ad-hock vehicular network is not a vehicular micro cloud.

In some embodiments, the serverless ad-hock vehicular network includes a similar structure is operable to provide some or all of the functionality as a vehicular micro cloud. According, a vehicular micro cloud is now described according to some embodiments to provide an understanding of the structure and functionality of the serverless ad-hock vehicular network according to some embodiments. When describing the vehicular micro cloud, the term "vehicular micro cloud" can be replaced by the term "serverless ad-hoc vehicular network" since a vehicular micro cloud is an example of a serverless ad-hoc vehicular network in some embodiments.

Distributed data storage and computing by a group of connected vehicles (i.e., a "vehicular micro cloud") is a promising solution to cope with an increasing network traffic generated for and by connected vehicles. In some embodiments, a vehicular micro cloud is an example of a serverless ad-hoc vehicular network. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., high-definition road map for automated driving), shared computational power, shared bandwidth, shared memory, and cloudification services.

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "network tasks" if plural, or a "network task" if singular.

In some embodiments, a network task includes any computational, data storage, or data communication task collaboratively performed by a plurality of the members of a vehicular micro cloud.

In some embodiments, a computational task includes a processor executing code and routines to output a result. The result includes digital data that describes the output of executing the code and routines. For example, a computational task includes a processor executing code and routines to solve a problem, and the result includes digital data that describes the solution to the problem. In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a network task is collaboratively performed by the plurality of members executing computing processes in parallel which are configured to complete the execution of the network task.

In some embodiments, a serverless ad-hoc vehicular network includes a plurality of members that execute computing processes whose completion results in the execution of a network task. For example, the serverless ad-hock vehicular network provides a network task to a legacy vehicle.

Vehicular micro clouds are beneficial, for example, because they help vehicles to perform computationally expensive tasks that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other network tasks in addition to data storage tasks.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

As used herein, the term "vehicle" refers to a connected vehicle. For example, the ego vehicle and the remote vehicle depicted in FIG. 1 are connected vehicles. A connected vehicle is a conveyance, such as an automobile, that includes a communication unit that enables the conveyance to send and receive wireless messages via one or more wireless vehicular networks (e.g. the network 105 and the serverless ad-hoc vehicular network 194 depicted in FIG. 1). Accordingly, as used herein, the terms "vehicle" and "connected vehicle" may be used interchangeably. The embodiments described herein are beneficial for both drivers of human-driven vehicles as well as the autonomous driving systems of autonomous vehicles.

In some embodiments, the correction system improves the performance of a network or its endpoints because it beneficially takes steps enable the completion of network tasks.

In some embodiments, the correction system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; an edge server; and a roadside unit. For the purpose of clarity, the N remote vehicles may be referred to herein as the "remote vehicle" or the "remote vehicles" and this will be understood to describe N remote vehicles.

An example of a roadway environment according to some embodiments includes the roadway environment 140 depicted in FIG. 1. As depicted, the roadway environment 140 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The ego vehicle and the remote vehicles may be human-driven vehicles, autonomous vehicles, or a combination of human-driven vehicles and autonomous vehicles. In some embodiments, the ego vehicle and the remote vehicles may be equipped with DSRC equipment such as a GPS unit that has lane-level accuracy and a DSRC radio that is capable of transmitting DSRC messages.

In some embodiments, the ego vehicle and some or all of the remote vehicles include their own instance of a correction system. For example, in addition to the ego vehicle, some or all of the remote vehicles include an onboard unit having an instance of the correction system installed therein.

In some embodiments, the ego vehicle and one or more of the remote vehicles are members of a serverless ad-hoc vehicular network. In some embodiments, the remote vehicles are members of a serverless ad-hoc vehicular network, but the ego vehicle is not a member of the serverless ad-hoc vehicular network. In some embodiments, the ego vehicle and some, but not all, of the remote vehicles are members of the serverless ad-hoc vehicular network. In some embodiments, the ego vehicle and some or all of the remote vehicles are members of the same vehicular macro cloud but not the same serverless ad-hoc vehicular network, meaning that they are members of various serverless ad-hoc vehicular networks that are all members of the same vehicular macro cloud so that they are still interrelated to one another by the vehicular macro cloud.

An example of a serverless ad-hoc vehicular network according to some embodiments includes the serverless ad-hoc vehicular network 194 depicted in FIG. 1.

Accordingly, multiple instances of the correction system are installed in a group of connected vehicles. The group of connected vehicles are arranged as a serverless ad-hoc vehicular micro cloud.

Operation Center Functionality

In some embodiments, a serverless ad-hoc vehicular network includes an operation center. In some embodiments, an operation center provides functionality that is similar to the functionality provided by a hub. For example, the description of the hub provided below is an example of the functionality provided by an operation center in some embodiments. The functionality of a hub is now described for the purpose of describing the functionality of the operation center in some embodiments.

In some embodiments, the correction system that executes a method as described herein (e.g., the method 300 depicted in FIG. 3, the example general method) is an element of a hub or a hub vehicle. For example, the vehicular micro cloud formed by the correction system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1.

In some embodiments, the correction system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most memory most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the correction system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload. In some embodiments, the technical data is included in the payload data depicted in FIG. 1 which vehicles such as the ego vehicle and the remote vehicle broadcast to one another via BSMs, or other regular transmissions. In some embodiments, the payload data also includes the sensor data of the vehicle that transmits the BSM as well as some or all of the other digital data described herein as being an element of the payload data (e.g., the remote payload data 196, the legacy payload data 197, or the payload data for a wireless transmission of the ego vehicle 123, i.e., the ego payload data).

A vehicle's sensor data is the digital data recorded by that vehicle's onboard sensor set. In some embodiments, an ego vehicle's sensor data includes the sensor data recorded by another vehicle's sensor set; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the correction system is operable to provide its functionality to operating environments and network architectures that do not include a server. Use of servers is problematic because they create latency. For example, some prior art systems require that groups of vehicles relay all their messages to one another through a server. By comparison, the use of server is an optional feature in for the correction system. For example, the correction system is an element of a roadside unit that includes a communication unit but not a server. In another example, the correction system is an element of another vehicle such as one of the remote vehicles.

In some embodiments, the correction system is operable to provide its functionality even though the vehicle which includes the correction system does not have a Wi-Fi antenna as part of its communication unit. By comparison, some of the existing solutions require the use of a Wi-Fi antenna in order to provide their functionality. Because the correction system does not require a Wi-Fi antenna, it is able to provide its functionality to more vehicles, including older vehicles without Wi-Fi antennas.

In some embodiments, the correction system is operable to provide its functionality even though the vehicle which includes the correction system does not have a V2X radio as part of its communication unit. By comparison, some of the existing solutions require the use of a V2X radio in order to provide their functionality. Because the correction system does not require a V2X radio, it is able to provide its functionality to more vehicles, including older vehicles without V2X radios.

In some embodiments, the correction system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the correction system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the correction system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the correction system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

In some embodiments, an operation center includes a sensor rich vehicle, or a group of sensor rich vehicles, that are operable to provide functionality similar to the hub vehicle described above. In some embodiments, an operation center includes a sensor rich vehicle, or a group of sensor rich vehicles, that are operable to provide a location data correction service to a legacy vehicle. In some embodiments, an operation center includes a sensor rich vehicle, or a group of sensor rich vehicles, that are operable to provide functionality similar to the hub vehicle described above as well as providing a location data correction service to a legacy vehicle.

The existing solutions generally do not include serverless ad-hoc vehicular networks. Some groups of vehicles (e.g., cliques, platoons, etc.) might appear to be a serverless ad-hoc vehicular network when they in fact are not a serverless ad-hoc vehicular network. For example, in some embodiments a serverless ad-hoc vehicular network requires that all its members share it unused computing resources with the other members of the serverless ad-hoc vehicular network. Any group of vehicles that does not require all its members to share their unused computing resources with the other members is not a serverless ad-hoc vehicular network.

In some embodiments, a serverless ad-hoc vehicular network does not require a server and does not include one because of the latency created by communication with a server. Accordingly, any group of vehicles that includes a server or whose functionality incorporates a server is not a serverless ad-hoc vehicular network as this term is used herein.

In some embodiments, a serverless ad-hoc vehicular network formed by a correction system is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does not harness the unused computing resources of many different vehicles to perform complex computational tasks that a single vehicle alone cannot perform is not a serverless ad-hoc vehicular network.

In some embodiments, a serverless ad-hoc vehicular network can include vehicles that are parked, vehicles that are traveling in different directions, infrastructure devices, or almost any endpoint that is within communication range of a member of the serverless ad-hoc vehicular network.

In some embodiments, the correction system is configured so that vehicles are required to have a predetermined threshold of unused computing resources to become members of a serverless ad-hoc vehicular network. Accordingly, any group of vehicles that does not require vehicles to have a predetermined threshold of unused computing resources to become members of the group is not a serverless ad-hoc vehicular network in some embodiments.

In some embodiments, a hub or an operation center of a serverless ad-hoc vehicular network is pre-designated by a vehicle manufacturer by the inclusion of one a bit or a token in a memory of the vehicle at the time of manufacture that designates the vehicle as the hub or operation of all serverless ad-hoc vehicular network which it joins. Accordingly, if a group of vehicles does not include a hub vehicle having a bit or a token in their memory from the time of manufacture that designates it as the hub for all groups of vehicles that it joins, then this group is not a serverless ad-hoc vehicular network in some embodiments.

A serverless ad-hoc vehicular network is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method, and so, these networks are not a serverless ad-hoc vehicular network.

In some embodiments, a serverless ad-hoc vehicular network includes vehicles that are parked, vehicles that are traveling in different directions, infrastructure devices, or almost any endpoint that is within communication range of a member of the serverless ad-hoc vehicular network. By comparison, a group of vehicles that exclude such endpoints as a requirement of being a member of the group are not serverless ad-hoc vehicular network according to some embodiments.

In some embodiments, a serverless ad-hoc vehicular network is operable to complete computational tasks itself, without delegation of these computational tasks to a cloud server or edge server, using the onboard vehicle computers of its members; this is an example of a network task according to some embodiments. In some embodiments, a group of vehicles which relies on a cloud server for its computational analysis, or the difficult parts of its computational analysis, is not a serverless ad-hoc vehicular network. An example of a preferred embodiment of the correction system does not include a server in the operating environment which includes the correction system.

In some embodiments, the correction system enables a group of vehicles to perform computationally expensive tasks that could not be completed by any one vehicle in isolation.

Cellular Vehicle to Everything (C-V2X)

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides location data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

Location data includes digital data describing the location information outputted by the GPS unit. An example of a standard-compliant GPS unit according to some embodiments includes the standard-compliant GPS unit 150 depicted in FIG. 1.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the correction system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some embodiments, some or all of the wireless transmission described herein are C-V2X messages.

Vehicular Network

The correction system utilizes a vehicular network in some embodiments. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

In some embodiments, the correction system includes software installed in an onboard unit of a connected vehicle. This software is the "correction system" described herein.

An example operating environment for the embodiments described herein includes an ego vehicle, one or more remote vehicles, and a legacy vehicle. The ego vehicle, remote vehicle, and legacy vehicle are connected vehicles having communication units that enable them to send and receive wireless messages via one or more vehicular networks. In some embodiments, the ego vehicle, the remote vehicle, and the legacy vehicle include an onboard unit having a correction system stored therein. An example of a preferred embodiment of the correction system includes a serverless operating environment. A serverless operating environment is an operating environment which includes at least one correction system and does not include a server.

Figure 3:
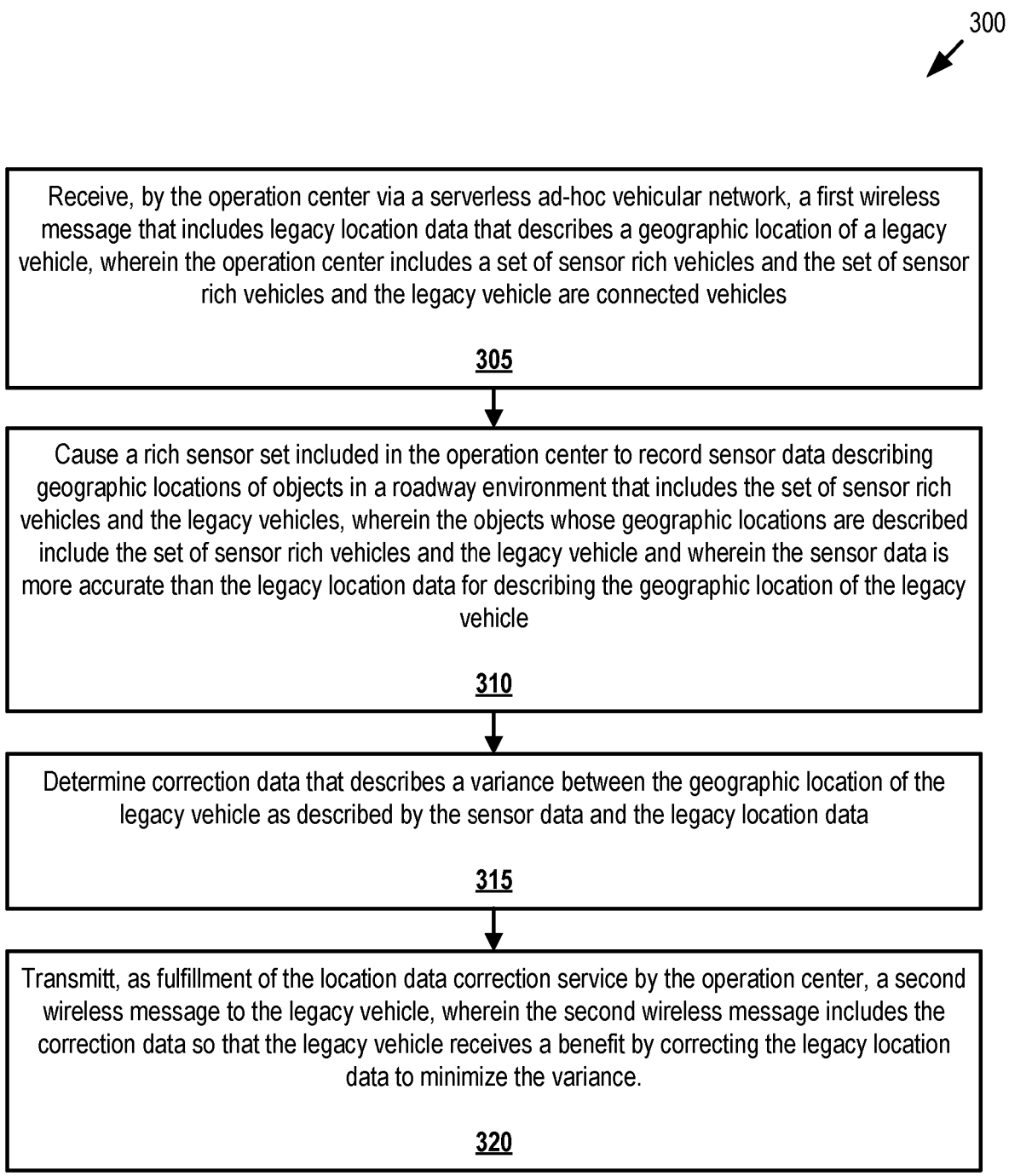
FIG. 3 is a flowchart of an example method for providing a location data correction service according to some embodiments.

In some embodiments, the correction system includes code and routines that are operable, when executed by a processor of the onboard unit, to cause the processor to execute one or more of the steps of the method 300 depicted in FIG. 3 or any other method described herein.

In some embodiments, this application is related to U.S. patent application Ser. No. 15/644,197 filed on Jul. 7, 2017 and entitled "Computation Service for Mobile Nodes in a Roadway Environment," the entirety of which is hereby incorporated by reference.

In some embodiments, this application is related to U.S. patent application Ser. No. 16/928,514 filed on Jul. 14, 2020 and entitled "Systems and Methods for Distributed Cooperative Localization in a Connected Vehicular Platform," the entirety of which is hereby incorporated by reference. For example, this related application, U.S. patent application Ser. No. 16/928,514, describes how the correction data is generated (e.g., step 315 of FIG. 3) according to some embodiments.

Described herein are embodiments of a correction system that provides a location data correction service. In some embodiments, the location data correction service is provided by an operation center of a serverless ad-hoc vehicular network. The operation center is one vehicle or a group of vehicles. In some embodiments, the operation center receives wireless messages from other members of the serverless ad-hoc vehicular network; these wireless messages include a payload that includes the location data for these members as well as, optionally, sensor data that describes the location of objects in their vicinity (e.g., within the roadway environment that includes the endpoints of the serverless ad-hoc vehicular network). The operation center also receives location data and/or sensor data from a legacy vehicle. The serverless ad-hoc vehicular network generally includes sensor rich vehicles, but in some embodiments the legacy vehicle is a member of the serverless ad-hoc vehicular network too.

In some embodiments, the operation center conducts a consensus optimization over the location data and/or the sensor data it receives. An embodiment of the consensus optimization is described according to some embodiments in U.S. patent application Ser. No. 16/928,514 filed on Jul. 14, 2020 and entitled "Systems and Methods for Distributed Cooperative Localization in a Connected Vehicular Platform," which is incorporated by reference above.

In some embodiments, the output of the consensus optimization includes correction data that describes errors in the location data that is received by the operation center. For example, the correction data describes a variance between the location data recorded by the legacy vehicle and the location data recorded by one or more sensor rich vehicles whose sensors are more accurate than the sensors of the legacy vehicles.

In some embodiments, the operation center broadcasts the correction data so that each member can correct its location data. In some embodiments, the correction data is unicast to particular vehicles such as the legacy vehicle.

In some embodiments, the location data correction service is provided using the serverless ad-hoc vehicular network and thus independent of any static infrastructure devices, edge servers, or cloud servers that would introduce latency into the functionality of the location data correction service.

Example General Method

In some embodiments, the correction system includes code and routines that are operable to execute one or more of the follow steps of an example general method:

Step 1: Build a serverless ad-hoc vehicular network. In some embodiments, the serverless ad-hoc vehicular network includes: (1) a set of sensor-rich vehicles, which are equipped with a powerful computational unit, and advanced sensors (lidar, radar, camera, etc.) that can conduct proactive sensing of a roadway environment; and (2) legacy vehicles, which only have conventional GPS receivers providing location data. All the location related measurements are not assumed perfect but with certain levels of uncertainties or errors. The vehicles formulate an ad-hoc network to provide the location data correction service responsive to a determination by one or more of these vehicles that this location data correction service to generate correction data. The vehicles that will be members of the serverless ad-hoc vehicular network exchange wireless messages to exchange information to enable the formation of the serverless ad-hoc vehicular network.

Step 2: An operation center is assigned. In some embodiments, not all vehicles that are members of the serverless ad-hoc vehicular network are operating to provide the location data correction service. Within the serverless ad-hoc vehicular network, at least one sensor-rich vehicle is assigned the operation center role. In some embodiments, a set of sensor rich vehicles are assigned the role of serving as the operation center. In some embodiments, the set of sensor rich vehicles that are selected to serve as the operation center are selected by balancing one or more of the following criteria: (1) maximizing the coverage area of the serverless ad-hoc vehicular network; (2) lowering the measurement uncertainty of the location data that results from the fulfillment of the location data correction service (e.g., minimizing occlusions in the measurements made by the sensors of the vehicles included in the serverless ad-hoc vehicular network); (3) optimizing computational power and complexity of the set of sensor rich vehicles that serve as the operation center; and (4) minimizing a total communication cost from the provision of the location data correction service. In some embodiments, the set of sensor rich vehicles are selected based at least in part on their trustworthiness.

Step 3: Execute the consensus optimization. An example of the consensus operation according to some embodiments is depicted in step 315 of FIG. 3.

In some embodiments, the correction system(s) of the operation center include code and routines that are operable, when executed by one or more processors, to cause the one or more process to execute steps that conduct a consensus optimization to compute the improved localization for all the participants in the serverless ad-hoc vehicular network, including the operation center itself.

In some embodiments, computing the "improved location" includes determining, on a vehicle-by-vehicle basis: (1) a consensus among the vehicles of the serverless ad-hoc vehicular network about the actual location of these vehicles and other objects in the roadway environment [see, e.g., the collaborative location data 172 depicted in FIGS. 1]; and (2) correction data that describes the variance between the location data provided by each vehicle to the operation center and the actual locations determined by the correction system.

In some embodiments, computing the "improved location" includes the sensor rich vehicles of the roadway environment sensing their vicinity using their onboard sensors that collect point cloud sweeps and camera frames. Sensed information is processed to identify and track surrounding vehicles. In some embodiments, this identification and tracking includes a determination of geographic locations for these vehicles as well as their onboard path history, which is a collection of time synchronized geographic locations of these vehicles. These locations and/or path histories are described by the location data generated by these sensor rich vehicles (see, e.g., the ego location data 191 and/or remote location data 192 depicted in FIG. 1 according to some embodiments). Furthermore, the sensor rich vehicles infer the distance and angle between themselves and the vehicles identified by their onboard sensors. In some embodiments, the distance is described by distance data (see, e.g., the distance data 173 depicted in FIG. 1) and the angle is described by the angle data (see, e.g., the angle data 171 depicted in FIG. 1), both of which are generated by these sensor rich vehicles. A legacy vehicle in the roadway environment also shares its onboard GPS readings to the nearby sensor rich vehicle through V2X communication (see, e.g., the legacy location data 193 depicted in FIG. 1 according to some embodiments). All of this digital data is shared with the operation center, which includes one or more of the sensor rich vehicles that are members of the serverless ad-hoc vehicular network. This digital data is shared with the operation center via V2X messages (e.g., BSMs) that are transmitted by the vehicles included in the serverless ad-hoc vehicular network. This digital data is included in payload data that is included in the V2X messages (see, e.g., the remote payload data 196 and the legacy payload data 197 depicted in FIG. 1). The digital data provided by the sensor rich vehicles (e.g., the ego vehicle 123 and the remote vehicles 124 depicted in FIG. 1) is referred to as "proactive location estimates." In some embodiments, the operation center conducts a consensus optimization process on the proactive location estimates (e.g., the ego location data and the remote location data) and the legacy location data. In some embodiments, this consensus optimization process includes fusing the proactive location estimates and the legacy location data so as to minimize the cumulative location error while preserving the shape of the traffic scene. The result of this fusing is the collaborative location data (see, e.g., the collaborative location data 172 depicted in FIG. 1). In some embodiments, the collaborative location data includes digital data that describes, for each vehicle or other object in the roadway environment, a fusion of all the digital data received for this particular vehicle or object. For example, for a particular vehicle, the collaborative location data 172 for this vehicle describes a fusion of the self-reported location data for this vehicle, the location of this vehicle as determined by the other vehicles, and the location of this vehicle as determined by the operation center from the angle data and the distance data for this vehicle. Variances between the self-reported location for this vehicle and the collaborative location data for this vehicle may be referred to as a "location error." In some embodiments, the consensus operation includes the correction system mathematically solving for the locations of all vehicles included in the serverless ad-hoc vehicular network to minimize a weighted sum of the location errors. In some embodiments, these weights are assigned to the self-reported digital data based on a confidence level associated with the accuracy of sensors at the transmitter. Vehicles having more accurate sensors are assigned a higher confidence level by the correction system. In some embodiments, the vehicles report technical data to the operation center describing, among other things, the quality of their sensors and the correction system assigns confidence levels to the payload data for these vehicles on a vehicle-by-vehicle basis based on the confidence level assigned to each vehicle by the correction system.

An embodiment of the consensus optimization is described according to some embodiments in U.S. patent application Ser. No. 16/928,514 filed on Jul. 14, 2020 and entitled "Systems and Methods for Distributed Cooperative Localization in a Connected Vehicular Platform," which is incorporated by reference above.

Step 4: Provide a correction signal to the members of the serverless ad-hoc vehicular network. The correction system generates correction data. The correction data includes digital data that describes, on a vehicle-by-vehicle basis, the variance between the collaborative location data and each vehicle's self-reported location data. The correction signal causes one or more communication units of the operation center to transmit V2X messages to the members of the serverless ad-hoc vehicular network that includes the correction data for these vehicles. In some embodiments, this transmission includes the correction data for each member so that only one V2X message is broadcast by the operation center for general receipt by the members. The correction systems of the members then correct their local location data based on the correction data thereby improving the operation of their ADAS systems and other onboard systems which rely on location data to provide their functionality.

Example Operative Environment

In some embodiments, a serverless ad-hoc vehicular network includes a group of connected vehicles where vehicles collaborate to perform data processing, sensing and communication tasks (e.g., network tasks) through V2X networks. Vehicle platooning, on the other hand, is an extended version of the Adaptive Cruise Control (ACC) system which maintains a proper following distance by slowing down once vehicles get too close. A platoon is not a vehicular micro cloud. A platoon is much more stable in terms of network dynamicity where platoon members are not changing frequently. In the serverless ad-hoc vehicular network, on the other hand, there is more frequent network fragmentation due to fast topology changes which require additional and intelligent system and methods to ensure efficient and scalable serverless network tasks and/or application.

An existing solution to vehicular task execution involves vehicle platoons. As explained herein, a platoon is not a serverless ad-hoc vehicular network and does not provide the benefits of a vehicular micro cloud, and some embodiments of the correction system requires a serverless ad-hoc vehicular network; this distinction alone differentiates the correction system from the existing solutions. The correction system is different from the existing solution for additional reasons. For example, the existing solution that relies on vehicle platooning does not include an operation center or an equivalent "leader" or "leadership group" that provides the same functionality as the operation center. As another distinction, the existing solutions require the use of infrastructure devices such as roadside units and edge servers. By comparison, the embodiments described herein exclude the use of such infrastructure devices, and any wireless network or "platoon" that includes such infrastructure devices is not a serverless ad-hoc vehicular network. As another distinction, the existing solutions require a central infrastructure device or edge server to serve as a centralized coordinator of the vehicle platoon. By comparison, some of the embodiments described herein are fully distributed and require no single centralized coordinator.

Embodiments of the correction system are now described. Referring now to FIG. 1, depicted is a block diagram illustrating an operating environment 100 for a correction system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123"); an Nth remote vehicle 124 (where "N" refers to any positive whole number greater than one); and a legacy vehicle. These elements are communicatively coupled to one another via a network 105. In some embodiments, these elements are communicatively coupled to one another via a serverless ad-hoc vehicular network 194. These elements of the operating environment 100 are depicted by way of illustration. In practice, the operating environment 100 may include one or more of the elements depicted in FIG. 1. The Nth remote vehicle 124 may be referred to as a remote vehicle 124.

The operating environment 100 also includes the roadway environment 140. The roadway environment 140 was described above, and that description will not be repeated here.

In some embodiments, one or more of the ego vehicle 123, the remote vehicle 124, the legacy vehicle 104, and the network 105 are elements of a serverless ad-hoc vehicular network 194.

In some embodiments, the ego vehicle 123 and the remote vehicle 124 include similar elements. For example, each of these elements of the operating environment 100 include their own processor 125, bus 121, memory 127, communication unit 145, rich sensor set 126, onboard unit 139, standard-compliant GPS unit 150, and correction system 199. These elements of the ego vehicle 123 and the remote vehicle 124 provide the same or similar functionality regardless of whether they are included in the ego vehicle 123 or the remote vehicle 124. Accordingly, the descriptions of these elements will not be repeated in this description for each of the ego vehicle 123 and the remote vehicle 124.

The legacy vehicle 104 also includes some elements in common with the ego vehicle 123. For example, the legacy vehicle 104 includes a processor 125, a bus 121, a memory 127, a communication unit 145, an onboard unit 139, and a correction system 199. These elements of the legacy vehicle 104 provide the same or similar functionality as those included in the ego vehicle 123 and the remote vehicle 124, and so, those descriptions will not be repeated for the description of the legacy vehicle 104.

The legacy vehicle 104 is also different than either the ego vehicle 123 or the remote vehicle 124. For example, the legacy vehicle 104 includes a legacy sensor set 162 that is different than the rich sensor set 126 included in the ego vehicle 123 and the remote vehicle 124. The ego vehicle 123 and the remote vehicle 124 are sensor rich vehicles. The overall sensing ability of the rich sensor set 126 is greater than the overall sensing ability of the legacy sensor set 162. For example, a roadway environment 140 includes a set of sensor rich vehicles (the ego vehicle 123 and the remote vehicle 124) and a legacy vehicle 104; the rich sensor set 126 is operable to generate sensor measurements that more accurately describe the geographic locations of objects in the roadway environment 140 when compared to the sensor measurements generated by the legacy sensor set 162.

The sensor rich vehicles also include a standard-compliant GPS unit 150 whereas the legacy vehicle 104 includes a conventional GPS unit 128. The accuracy of the standard-compliant GPS unit 150 is greater than the accuracy of the conventional GPS unit 128. For example, the standard-compliant GPS unit 150 generates location data that is has lane-level accuracy (e.g., plus or minus 1.5 meters under ideal conditions), whereas the conventional GPS unit 128 provides location data that has an accuracy of plus or minus 10 meters.

In the depicted embodiment, the ego vehicle 123, the remote vehicle 124, and the legacy vehicle 104 include non-transitory memories that store similar digital data.

In some embodiments, the serverless ad-hoc vehicular network 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference.

In some embodiments, the serverless ad-hoc vehicular network 194 is a stationary vehicular micro cloud or a mobile vehicular micro cloud. For example, each of the ego vehicle 123 and the remote vehicle 124 are members of the serverless ad-hoc vehicular network 194 because they are connected endpoints that are members of the serverless ad-hoc vehicular network 194 that can access and use the unused computing resources (e.g., their unused processing power, unused data storage, unused sensor capabilities, unused bandwidth, etc.) of the other members using wireless communications that are transmitted via the network 105 and these wireless communicates are not required to be relayed through a cloud server or any other infrastructure device.

In some embodiments, the serverless ad-hoc vehicular network 194 is a vehicular micro cloud such as the one described in U.S. patent application Ser. No. 15/799,963.

As used in this patent application, the terms a "vehicular micro cloud" and a "micro-vehicular" cloud mean the same thing.

In some embodiments, a serverless ad-hoc vehicular network 194 is not a V2X network or a V2V network because, for example, such networks do not include allowing endpoints of such networks to access and use the unused computing resources of the other endpoints of such networks. By comparison, in some embodiments a serverless ad-hoc vehicular network 194 requires allowing all members of the serverless ad-hoc vehicular network 194 to access and use designated unused computing resources of the other members of the serverless ad-hoc vehicular network 194. In some embodiments, endpoints must satisfy a threshold of unused computing resources in order to join the serverless ad-hoc vehicular network 194. The operation center of the serverless ad-hoc vehicular network 194 executes a process to: (1) determine whether endpoints satisfy the threshold as a condition for joining the serverless ad-hoc vehicular network 194; and (2) determine whether the endpoints that do join the serverless ad-hoc vehicular network 194 continue to satisfy the threshold after they join as a condition for continuing to be members of the serverless ad-hoc vehicular network 194.

In some embodiments, a member of the serverless ad-hoc vehicular network 194 includes any endpoint (e.g., the ego vehicle 123, the remote vehicle 124, the legacy vehicle 104, etc.) which has completed a process to join the serverless ad-hoc vehicular network 194 (e.g., a handshake process with the coordinator of the serverless ad-hoc vehicular network 194). Cloud servers and infrastructure devices of the roadway environment 140 are excluded from membership in some embodiments. A member of the serverless ad-hoc vehicular network 194 is described herein as a "member" or a "network member." In some embodiments, an operation center of the serverless ad-hoc vehicular network 194 is the hub of a vehicular micro cloud (e.g., the ego vehicle 123).

In some embodiments, the memory 127 of one or more of the endpoints stores member data. The member data is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the memories 127 of the members of the serverless ad-hoc vehicular network 194 store member data. The member data includes digital data that describes logical associations between endpoints which are a necessary component of the serverless ad-hoc vehicular network 194 and serves the differentiate the serverless ad-hoc vehicular network 194 from a mere V2X network. In some embodiments, a serverless ad-hoc vehicular network 194 must include an operation center and this is a further differentiation from a serverless ad-hoc vehicular network 194 and a V2X network or a group, clique, or platoon of vehicles which is not a serverless ad-hoc vehicular network 194.

In some embodiments, the serverless ad-hoc vehicular network 194 does not include a hardware server. Accordingly, in some embodiments the serverless ad-hoc vehicular network 194 may be described as serverless.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network.

The network 105 is an element of the serverless ad-hoc vehicular network 194. Accordingly, the serverless ad-hoc vehicular network 194 is not the same thing as the network 105 since the network is merely a component of the serverless ad-hoc vehicular network 194. For example, the network 105 does not include member data. The network 105 also does not include an operation center.

In some embodiments, one or more of the ego vehicle 123 and the remote vehicle 124 are C-V2X equipped vehicles. For example, the ego vehicle 123 includes a standard-compliant GPS unit 150 that is an element of the rich sensor set 126 and a C-V2X radio that is an element of the communication unit 145. The network 105 may include a C-V2X communication channel shared among the ego vehicle 123 and a second vehicle such as the remote vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105. For example, the ego vehicle 123 transmits and receives C-V2X messages via the network 105.

The ego vehicle 123 includes one or more of the following elements: a processor 125; a rich sensor set 126; a standard-compliant GPS unit 150; a vehicle control system 153; a communication unit 145; an onboard unit 139; a memory 127; and a correction system 199. These elements may be communicatively coupled to one another via a bus 121. In some embodiments, the communication unit 145 includes a C-V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an advanced driver assistance system ("ADAS") or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the correction system 199. In some embodiments, the onboard unit 139 is the computer system 200 depicted in FIG. 2. In some embodiments, the onboard unit 139 is an electronic control unit (ECU).

The rich sensor set 126 includes one or more onboard sensors. The rich sensor set 126 may record sensor measurements that describe the ego vehicle 123 or the physical environment that includes the ego vehicle 123. The sensor data 195 includes digital data that describes the sensor measurements.

In some embodiments, the rich sensor set 126 may include one or more sensors that are operable to measure the physical environment outside of the ego vehicle 123 (e.g., the roadway environment 140). For example, the rich sensor set 126 may include cameras, lidar, radar, sonar and other sensors that record one or more physical characteristics of the physical environment that is proximate to the ego vehicle 123.

In some embodiments, the rich sensor set 126 may include one or more sensors that are operable to measure the physical environment inside a cabin of the ego vehicle 123. For example, the rich sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the rich sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The legacy sensor set 162 of the legacy vehicle 104 includes similar types of sensors as those included in the sensor rich vehicles, but some or all of the sensors included in the legacy sensor set 162 are less accurate than those included in the rich sensor set 126.

The rich sensor set 126 is operable to record sensor data 195. The sensor data 195 includes digital data that describes images or other measurements of the physical environment (e.g., the roadway environment 140) such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the rich sensor set 126.

The physical environment may include a roadway region, parking lot, or parking garage that is proximate to the ego vehicle 123. The sensor data may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the rich sensor set 126 or whose presence is determinable from the digital data stored on the memory 127. An item is "proximate to the ego vehicle 123" if it is directly measurable by a sensor of the ego vehicle 123 or its presence is inferable and/or determinable by the correction system 199 based on analysis of the sensor data which is recorded by the ego vehicle 123 and/or one or more of the serverless ad-hoc vehicular network 194.

In some embodiments, the sensors of the rich sensor set 126 are operable to collect sensor data 195. The sensors of the rich sensor set 126 include any sensors that are necessary to measure and record the measurements described by the sensor data 195. In some embodiments, the sensor data 195 includes any sensor measurements that are necessary to generate the other digital data stored by the memory 127. In some embodiments, the sensor data 195 includes digital data that describes any sensor measurements that are necessary for the correction system 199 provides its functionality as described herein with reference to the method 300 depicted in FIG. 3. In some embodiments, the sensor data 195 includes digital data that describes any sensor measurements that are necessary for the correction system 199 provides its functionality as described herein with reference to the example general method.

The sensor data 195 generated by a sensor rich vehicle describes the sensor measurements recorded by the rich sensor set 126, whereas the sensor data 195 generated by the legacy vehicle 104 describes the sensor measurements recorded by the legacy sensor set 162.

In some embodiments, the rich sensor set 126 includes any sensors that are necessary to record sensor data 195 that describes the roadway environment 140 in sufficient detail to create a digital twin of the roadway environment 140.

For example, in some embodiments the correction system 199 includes simulation software. The simulation software is any simulation software that is capable of simulating an execution of a network task by the serverless ad-hoc vehicular network 194. For example, the simulation software is a simulation software that is capable of executing a digital twin simulation.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

Digital twins, and an example process for generating and using digital twins which is implemented by the correction system 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

In some embodiments, the simulation software is integrated with the correction system 199. In some other embodiments, the simulation software is a standalone software that the correction system 199 can access to execute digital twin simulations to determine some or all of the digital data stored in the memory 127 (e.g., the collaborative location data 172, the correction data 174, etc.).

The sensor data 195 includes digital data that describes any measurement that is taken by one or more of the sensors of the rich sensor set 126.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload location data having one or more attributes.

An example of an attribute for location data, such as the ego location data 191, is accuracy. In some embodiments, the standard-compliant GPS unit 150 is operable to generate GPS measurements which are sufficiently accurate to describe the location of the ego vehicle 123 with lane-level accuracy; these measurements are described by the ego location data 191. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 150 is operable to provide location data describing the location of the ego vehicle 123 with lane-level accuracy. For example, the ego vehicle 123 is traveling in a lane of a multi-lane roadway. Lane-level accuracy means that the lane of the ego vehicle 123 is described by the location data so accurately that a precise lane of travel of the ego vehicle 123 may be accurately determined based on the location data for this vehicle 123 as provided by the standard-compliant GPS unit 150.

An example process for generating location data describing a geographic location of an object (e.g., a queue, the ego vehicle 123, the remote vehicle 124, or some other object located in a roadway environment) is now described according to some embodiments. In some embodiments, the correction system 199 include code and routines that are operable, when executed by the processor 125, to cause the processor to: analyze (1) location data describing the geographic location of the ego vehicle 123 and (2) sensor data describing the range separating the ego vehicle 123 from an object and a heading for this range; and determine, based on this analysis, location data describing the location of the object. The location data describing the location of the object may also have lane-level accuracy because, for example, it is generated using accurate location data of the ego vehicle 123 and accurate sensor data describing information about the object.

In some embodiments, the standard-compliant GPS unit 150 includes hardware that wirelessly communicates with a GPS satellite (or GPS server) to retrieve location data that describes the geographic location of the ego vehicle 123 with a precision that is compliant with a V2X standard. One example of a V2X standard is the DSRC standard. Other standards governing V2X communications are possible. The DSRC standard requires that location data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the location data is less than 1.5 meters the correction system 199 described herein may analyze the location data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit 128 which is not compliant with the DSRC standard is unable to determine the location of a vehicle (e.g., the ego vehicle 123) with lane-level accuracy. For example, a typical roadway lane is approximately 3 meters wide. However, a conventional GPS unit 128 only has an accuracy of plus or minus 10 meters relative to the actual location of the ego vehicle 123. As a result, such conventional GPS units 128 are not sufficiently accurate to enable the correction system 199 to determine the lane of travel of the ego vehicle 123. This measurement improves the accuracy of the ego location data 191 describing the location of lanes used by the ego vehicle 123 when the correction system 199 is providing its functionality.

In some embodiments, the memory 127 stores two types of ego location data 191. The first is location data of the ego vehicle 123 and the second is location data of one or more objects (e.g., the remote vehicle 124, the legacy vehicle 104, or some other object in the roadway environment). The location data of the ego vehicle 123 is digital data that describes a geographic location of the ego vehicle 123. The location data of the objects is digital data that describes a geographic location of an object. One or more of these two types of location data may have lane-level accuracy. The location data of the object may be determined, for example, by a combination of the location data of the ego vehicle 123 as well as the distance and angle separating the ego vehicle 123 and the object; this angle data 171 and distance data 173 in combination with the location of the ego vehicle 123 enables the correction system 199 to predetermine the location of the objects using triangulation.

In some embodiments, one or more of these two types of location data are described by the sensor data 195. For example, the standard-compliant GPS unit 150 is a sensor included in the rich sensor set 126 and the location data is an example type of sensor data 195.

The memory 127 of the ego vehicle 123 also stores legacy location data 193 and legacy payload data 197 which the ego vehicle 123 receives from the legacy vehicle 104 via BSMs or some other V2X transmission of the legacy vehicle 104. The legacy payload data 197 includes the legacy location data 193 recorded by the legacy sensor set 162, angle data 171 recorded by the legacy sensor set 162, distance data 173 recorded by the legacy sensor set 162, and sensor data 195 recorded by the legacy sensor set 162.

The memory 127 of the ego vehicle 123 further stores remote location data 192 and remote payload data 196 which the ego vehicle 123 receives from the remote vehicle 124 via BSMs or some other V2X transmission of the remote vehicle 124. The remote payload data 196 includes the remote location data 192 recorded by the rich sensor set 126 of the remote vehicle 124, angle data 171 recorded by the rich sensor set 126 of the remote vehicle 124, distance data 173 recorded by the rich sensor set 126 of the remote vehicle 124, and sensor data 195 recorded by the rich sensor set 126 of the remote vehicle 124.

The memory 127 of the ego vehicle 123 also stores ego location data 191 recorded by the rich sensor set 126 of the ego vehicle 123, angle data 171 recorded by the rich sensor set 126 of the ego vehicle 123, distance data 173 recorded by the rich sensor set 126 of the ego vehicle 123, and sensor data 195 recorded by the rich sensor set 126 of the ego vehicle 123.

The communication unit 145 transmits and receives data to and from a network 105 or to another communication channel. In some embodiments, the communication unit 145 includes a DSRC transmitter, a DSRC receiver and other hardware or software necessary to make the ego vehicle 123 a DSRC-equipped device. In some embodiments, the correction system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369,262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 300 depicted in FIG. 3, or the example general method, are transmitted by the C-V2X radio on the upper 30 MHz of the 5.9 GHz band (i.e., 5.895-5.925 GHz) as directed by the correction system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs. In some embodiments, the non-transitory memory stores a buffered version of the location data for the ego vehicle 123 so that the location data for the ego vehicle 123 is broadcast as an element of the BSM messages which are regularly broadcast by the V2X radio (e.g., at an interval of once every 0.10 seconds).

In some embodiments, the V2X radio includes any hardware or software which is necessary to make the ego vehicle 123 compliant with the DSRC standards. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the ego location data 191; the remote location data 192; the legacy location data 193; the angle data 171; the collaborative location data 172; the sensor data 195; the remote payload data 196; the legacy payload data 197; the distance data 173; and the correction data 174. These elements were described above with reference to the example general method, and so, those descriptions will not be repeated here: the ego location data 191; the remote location data 192; the legacy location data 193; the angle data 171; the collaborative location data 172; the sensor data 195; the remote payload data 196; the legacy payload data 197; the distance data 173; and the correction data 174.

In some embodiments, the memory 127 stores threshold data. The threshold data includes digital data that describes any threshold described herein. For example, in some embodiments, the method 300 is terminated if its execution satisfies a predetermined threshold for latency for wireless transmissions which are included in the execution of the method 300. In some embodiments, execution of the method 300 is triggered by a threshold be satisfied.

In some embodiments, the memory 127 stores some or all of the digital data described herein. In some embodiments, the memory 127 stores any digital data that is necessary for the correction system 199 to provide its functionality.

In some embodiments, the ego vehicle 123 includes a vehicle control system. A vehicle control system includes one or more ADAS systems or an autonomous driving system.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system of the ego vehicle 123 that is operable to identify one or more factors (e.g., using one or more onboard vehicle sensors) affecting the ego vehicle 123 and modify (or control) the operation of the ego vehicle to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle may have a LKA system installed and operational in an ego vehicle may detect, using one or more external cameras of the ego vehicle, an event in which the ego vehicle is near passing a center yellow line which indicates a division of one lane of travel from another lane of travel on a roadway. The LKA system may provide a notification to a driver of the ego vehicle that this event has occurred (e.g., an audible noise or graphical display) or take action to prevent the ego vehicle from actually passing the center yellow line such as making the steering wheel difficult to turn in a direction that would move the ego vehicle over the center yellow line or actually moving the steering wheel so that the ego vehicle is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the correction system 199 includes code and routines that are operable, when executed by the processor 125, to execute one or more steps of the method 300 described below with reference to FIG. 3. In some embodiments, the correction system 199 includes code and routines that are operable, when executed by the processor 125, to execute one or more steps of the example general method.

Figure 2:
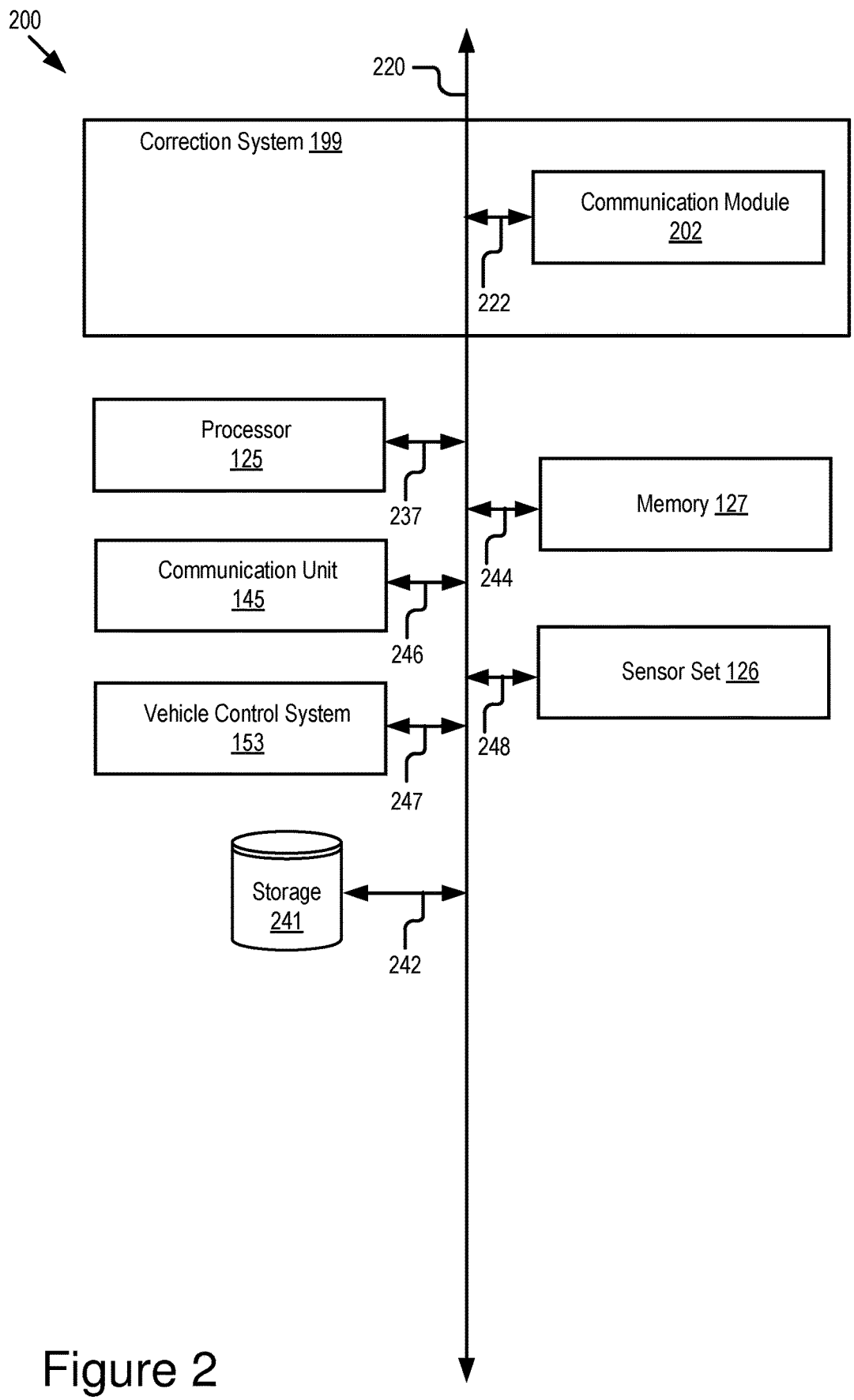
FIG. 2 is a block diagram illustrating an example computer system including a correction system according to some embodiments.

An example embodiment of the correction system 199 is depicted in FIG. 2. This embodiment is described in more detail below.

In some embodiments, the correction system 199 is an element of the onboard unit 139 or some other onboard vehicle computer. In some embodiments, the correction system 199 includes code and routines that are stored in the memory 127 and executed by the processor 125 or the onboard unit 139.

In some embodiments, the correction system 199 is implemented using hardware including a field-programmable gate array ("FPGA") or an application-specific integrated circuit ("ASIC"). In some other embodiments, the correction system 199 is implemented using a combination of hardware and software.

The remote vehicle 124 includes elements and functionality which are similar to those described above for the ego vehicle 123, and so, those descriptions will not be repeated here. The remote vehicle 124 and the ego vehicle 123 are sensor rich vehicles.

The legacy vehicle 104 is not a sensor rich vehicle. With the exception of the legacy sensor set 162 and the conventional GPS unit 128, the legacy vehicle 104 includes elements and functionality which are similar to those described above for the ego vehicle 123, and so, those descriptions will not be repeated here. The legacy sensor set 162 and the conventional GPS unit 128 are described above, and so, those descriptions will not be repeated here.

In some embodiments, the correction system 199 of the legacy vehicle 104 includes code and routines that are operable to build the legacy payload data 197, provide the legacy payload data 197 to the operation center via one or more V2X messages, receive correction data 174 from the operation center via one or more V2X messages, and modify the legacy location data 193 stored by the memory of the legacy vehicle 104 based on the variance described by the correction data 174.

In some embodiments, the ego vehicle 123, the remote vehicle 124, and the legacy vehicle 104 are located in a roadway environment 140. The roadway environment 140 is a portion of the real-world that includes a roadway, the ego vehicle 123, the remote vehicle 124, and the legacy vehicle 104. The roadway environment 140 may include other elements such as the serverless ad-hoc vehicular network 194, roadway signs, environmental conditions, traffic, etc. The roadway environment 140 includes some or all of the tangible and/or measurable qualities described above with reference to the sensor data 195.

In some embodiments, the real-world includes the real of human experience comprising physical objects and excludes artificial environments and "virtual" worlds such as computer simulations.

In some embodiments, the serverless ad-hoc vehicular network 194 is stationary. In other words, in some embodiments the serverless ad-hoc vehicular network 194 is a "stationary vehicular micro cloud." A stationary vehicular micro cloud is a wireless network system in which a plurality of connected vehicles (such as the ego vehicle 123, the remote vehicle 124, etc.) form a network of interconnected vehicles that are located at a same geographic region. These connected vehicles are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the serverless ad-hoc vehicular network 194 and not non-members such as the cloud server 103. Connected vehicles which are members of the same stationary vehicular micro cloud make their unused computing resources available to the other members of the stationary vehicular micro cloud.

In some embodiments, the serverless ad-hoc vehicular network 194 is "stationary" because the geographic location of the serverless ad-hoc vehicular network 194 is static; different vehicles constantly enter and exit the serverless ad-hoc vehicular network 194 over time. This means that the computing resources available within the serverless ad-hoc vehicular network 194 is variable based on the traffic patterns for the geographic location at different times of day: increased traffic corresponds to increased computing resources because more vehicles will be eligible to join the serverless ad-hoc vehicular network 194; and decreased traffic corresponds to decreased computing resources because less vehicles will be eligible to join the serverless ad-hoc vehicular network 194.

In some embodiments, the serverless ad-hoc vehicular network 194 includes a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124, 104.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the correction system 199 includes encryption keys for encrypting wireless messages and decrypting the wireless messages described herein.

Referring now to FIG. 2, depicted is a block diagram illustrating an example computer system 200 including a correction system 199 according to some embodiments.

In some embodiments, the computer system 200 may include a special-purpose computer system that is programmed to perform one or more steps of one or more of the method 300 described herein with reference to FIG. 3.

In some embodiments, the computer system 200 may include a processor-based computing device. For example, the computer system 200 may include an onboard vehicle computer system of the ego vehicle 123, the remote vehicle 124, or the legacy vehicle 104.

The computer system 200 may include one or more of the following elements according to some examples: the correction system 199; a processor 125; a communication unit 145; a vehicle control system 153; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The vehicle control system 153 is communicatively coupled to the bus 220 via a signal line 247. The storage 241 is communicatively coupled to the bus 220 via a signal line 242. The memory 127 is communicatively coupled to the bus 220 via a signal line 244. The rich sensor set 126 is communicatively coupled to the bus 220 via a signal line 248.

In some embodiments, the rich sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 153; the memory 127; and the rich sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the correction system 199 includes code and routines that are operable, when executed by the processor 125, to cause the processor 125 to execute one or more steps of the method 300 described herein with reference to FIG. 3.

In the illustrated embodiment shown in FIG. 2, the correction system 199 includes a communication module 202.

The communication module 202 can be software including routines for handling communications between the correction system 199 and other components of the computer system 200. In some embodiments, the communication module 202 can be a set of instructions executable by the processor 125 to provide the functionality described below for handling communications between the correction system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the correction system 199 and stores the data in one or more of the storage 241 and the memory 127.

In some embodiments, the communication module 202 may handle communications between components of the correction system 199 or the computer system 200.

Referring now to FIG. 3, depicted is a flowchart of an example method 300. The method 300 includes step 305, step 310, step 315, and step 320 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

Example differences in technical effect between the method 300 and the prior art are described below. These examples are illustrative and not exhaustive of the possible differences.

Existing solutions require the use of vehicle platooning. In some embodiments, a first difference in technical effect is that the existing solutions do not include a serverless ad-hoc vehicular network. By comparison, embodiments of the correction system use a serverless ad-hoc vehicular network to provide its functionality. A platoon is not a serverless ad-hoc vehicular network and does not provide the benefits of a serverless ad-hoc vehicular network.

In some embodiments, a second difference in technical effect is that the existing solution does not include an operation center. By comparison, embodiments of the correction system include an operation center.

In some embodiments, a third difference in technical effect is that the exiting solution relies on infrastructure devices and servers to provide its functional. By comparison, embodiments of the correction system exclude the use of infrastructure devices and servers to provide its functionality.

These differences are illustrative and not exclusive. Other differences are described herein and otherwise obvious to one having skill in the art.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for providing a location data correction service, the method executed by an operation center that includes a set of sensor rich vehicles and comprising:
    receiving, by the operation center via a serverless ad-hoc vehicular network, a first wireless message that includes legacy location data that describes a geographic location of a legacy vehicle, wherein the set of sensor rich vehicles and the legacy vehicle are connected vehicles and wherein the first wireless message is transmitted by a communication unit of the legacy vehicle that is communicatively coupled to a processor of the legacy vehicle;
    causing a rich sensor set included in the operation center to record sensor data describing geographic locations of objects in a roadway environment that includes the set of sensor rich vehicles and the legacy vehicles, wherein the objects whose geographic locations are described include the set of sensor rich vehicles and the legacy vehicle and wherein the sensor data is more accurate than the legacy location data for describing the geographic location of the legacy vehicle;
    determining correction data that describes a variance between the geographic location of the legacy vehicle as described by the sensor data and the legacy location data; and
    transmitting, as fulfillment of the location data correction service by the operation center, a second wireless message to the legacy vehicle, wherein the second wireless message includes the correction data so that the legacy vehicle receives a benefit including correcting the legacy location data to minimize the variance and wherein the second wireless message is received by the communication unit of the legacy vehicle;
    wherein the location data correction service improves the operation of the legacy vehicle by the legacy vehicle modifying its own sensor data based on variance information included in the correction data.

2. The method of claim 1, wherein the set of sensor rich vehicles includes one ego vehicle.

3. The method of claim 1, wherein the set of sensor rich vehicles includes a plurality of vehicles.

4. The method of claim 3, wherein the plurality of vehicles executes the method via collaborative computing so that different vehicles are responsible for executing different portions of the method.

5. The method of claim 1, wherein the operation center controls when vehicles join and leave the serverless ad-hoc vehicular network.

6. The method of claim 1, wherein the operation center manages how the set of sensor rich vehicles contribute computing power to the serverless ad-hoc vehicular network for a purpose of executing the method and fulfilling the location data correction service.

7. The method of claim 1, wherein the operation center controls which vehicles are eligible to join the serverless ad-hoc vehicular network based on their unused computing resources which they can make available to other members of the serverless ad-hoc vehicular network.

8. The method of claim 1, wherein the operation center is a single member of the serverless ad-hoc vehicular network that includes a most computing power relative to the other members of the serverless ad-hoc vehicular network.

9. The method of claim 1, wherein a determination of which vehicle included in the set of sensor rich vehicles is the operation center is made as members of the serverless ad-hoc vehicular network are driving in the roadway environment.

10. The method of claim 1, wherein the location data correction service is provided by the operation center which does not include an infrastructure device, a base station, a roadside device, an edge server, an edge node, or a cloud server.

11. The method of claim 1, wherein the operation center only includes members of the serverless ad-hoc vehicular network that are connected vehicles.

12. A computer program product included in at least one onboard vehicle computer of an operation center that includes a set of sensor rich vehicles, the computer program product comprising computer code that is operable, when executed by the onboard vehicle computer, to cause the onboard vehicle computer to provide a location data correction service by executing steps including:
    receiving, by the operation center via a serverless ad-hoc vehicular network, a first wireless message that includes legacy location data that describes a geographic location of a legacy vehicle, wherein the set of sensor rich vehicles and the legacy vehicle are connected vehicles and wherein the first wireless message is transmitted by a communication unit of the legacy vehicle that is communicatively coupled to a processor of the legacy vehicle;
    causing, by the onboard vehicle computer, a rich sensor set included in the operation center to record sensor data describing geographic locations of objects in a roadway environment that includes the set of sensor rich vehicles and the legacy vehicles, wherein the objects whose geographic locations are described include the set of sensor rich vehicles and the legacy vehicle and wherein the sensor data is more accurate than the legacy location data for describing the geographic location of the legacy vehicle;
    determining correction data that describes a variance between the geographic location of the legacy vehicle as described by the sensor data and the legacy location data; and transmitting, as fulfillment of the location data correction service by the operation center, a second wireless message to the legacy vehicle, wherein the second wireless message includes the correction data so that the legacy vehicle receives a benefit including correcting the legacy location data to minimize the variance and wherein the second wireless message is received by the communication unit of the legacy vehicle;

wherein the location data correction service improves the operation of the legacy vehicle by the legacy vehicle modifying its own sensor data based on variance information included in the correction data.

13. The computer program product of claim 12, wherein the set of sensor rich vehicles includes one ego vehicle.

14. The computer program product of claim 12, wherein the set of sensor rich vehicles includes a plurality of vehicles.

15. The computer program product of claim 14, wherein the plurality of vehicles executes the steps via collaborative computing so that different vehicles are responsible for executing different portions of the steps.

16. The computer program product of claim 12, wherein the operation center controls when vehicles join and leave the serverless ad-hoc vehicular network.

17. The computer program product of claim 12, wherein the operation center manages how the set of sensor rich vehicles contribute computing power to the serverless ad-hoc vehicular network for a purpose of executing the steps and fulfilling the location data correction service.

18. The computer program product of claim 12, wherein the operation center controls which vehicles are eligible to join the serverless ad-hoc vehicular network based on their unused computing resources which they can make available to other members of the serverless ad-hoc vehicular network.

19. The computer program product of claim 12, wherein the operation center is a single member of the serverless ad-hoc vehicular network that includes a most computing power relative to the other members of the serverless ad-hoc vehicular network.

20. A system included in an operation center that includes a set of sensor rich vehicles, the system operable to provide a location data correction service and comprising:

a processor;

a non-transitory memory communicatively coupled to the processor, wherein the non-transitory memory stores executable code that is operable, when executed by the processor, to cause the processor to:

receive, by the operation center via a serverless ad-hoc vehicular network, a first wireless message that includes legacy location data that describes a geographic location of a legacy vehicle, wherein the set of sensor rich vehicles and the legacy vehicle are connected vehicles and wherein the first wireless message is transmitted by a communication unit of the legacy vehicle that is communicatively coupled to a processor of the legacy vehicle;

cause a rich sensor set included in the operation center to record sensor data describing geographic locations of objects in a roadway environment that includes the set of sensor rich vehicles and the legacy vehicles, wherein the objects whose geographic locations are described include the set of sensor rich vehicles and the legacy vehicle and wherein the sensor data is more accurate than the legacy location data for describing the geographic location of the legacy vehicle;

determine correction data that describes a variance between the geographic location of the legacy vehicle as described by the sensor data and the legacy location data; and transmit, as fulfillment of the location data correction service by the operation center, a second wireless message to the legacy vehicle, wherein the second wireless message includes the correction data so that the legacy vehicle receives a benefit including correcting the legacy location data to minimize the variance and wherein the second wireless message is received by the communication unit of the legacy vehicle;

wherein the location data correction service improves the operation of the legacy vehicle by the legacy vehicle modifying its own sensor data based on variance information included in the correction data.

\* \* \* \* \*